(12) United States Patent
Cameron et al.

(10) Patent No.: US 6,403,177 B1
(45) Date of Patent: Jun. 11, 2002

(54) USE OF TETRAPHENYLBORATE FOR EXTRACTION OF AMMONIUM IONS AND AMINES FROM WATER

(75) Inventors: T. Stanley Cameron; Osvald Knop; Neil S. Cameron; Elinor M. Cameron, all of Halifax; G. Ronald Brown, Prince George, all of (CA)

(73) Assignee: Dalhousie University, Nova Scotia (CA)

( * ) Notice: Subject to any disclaimer, the term of this patent is extended or adjusted under 35 U.S.C. 154(b) by 0 days.

(21) Appl. No.: 09/703,726

(22) Filed: Nov. 2, 2000

Related U.S. Application Data

(62) Division of application No. 09/267,610, filed on Mar. 15, 1999, now Pat. No. 6,171,503.
(60) Provisional application No. 60/078,046, filed on Mar. 16, 1998.

(51) Int. Cl.$^7$ .................................................. C02F 1/42
(52) U.S. Cl. ...................... 428/35.2; 428/35.7; 428/402; 428/407; 423/335; 423/610; 423/625; 252/179; 521/30; 521/31; 521/34; 525/333.3; 525/333.4; 525/329.4; 525/337; 525/523; 525/529
(58) Field of Search ............................... 521/30, 31, 34; 525/337, 333.3, 333.4, 329.4, 523, 539; 428/35.2, 35.7, 407, 402; 252/179; 423/335, 610, 625

(56) References Cited

U.S. PATENT DOCUMENTS

| | | | |
|---|---|---|---|
| 3,433,755 A | * | 3/1969 | Cooke et al. ............... 525/337 |
| 4,107,099 A | * | 8/1978 | Hedge .......................... 521/30 |
| 4,432,893 A | | 2/1984 | Lee et al. |
| 4,434,075 A | | 2/1984 | Mardis et al. |
| 4,460,474 A | | 7/1984 | Blasius et al. |
| 4,542,161 A | * | 9/1985 | Filippini et al. .............. 521/53 |
| 4,654,146 A | | 3/1987 | Barkatt et al. |
| 4,695,387 A | | 9/1987 | Berry et al. |
| 4,790,960 A | | 12/1988 | Heckman et al. |
| 4,840,765 A | | 6/1989 | Doherty et al. |
| 5,124,235 A | | 6/1992 | Fukui et al. |
| 5,130,396 A | | 7/1992 | Panster et al. |
| 5,250,188 A | | 10/1993 | Bruening et al. |
| 5,407,655 A | | 4/1995 | Sarritzu |
| 5,433,868 A | | 7/1995 | Fassbender |
| 5,540,840 A | | 7/1996 | Heitkamp et al. |
| 5,641,413 A | | 6/1997 | Momont et al. |
| 5,666,641 A | | 9/1997 | Abney et al. |

FOREIGN PATENT DOCUMENTS

| | | |
|---|---|---|
| EP | A 0 327 796 | 8/1989 |
| EP | 0 490 385 A2 | 12/1991 |

\* cited by examiner

*Primary Examiner*—Fred Teskin
(74) *Attorney, Agent, or Firm*—Louis Woo

(57) ABSTRACT

A method of removing ammonium ions or amines from contaminated water includes treating the water with sodium tetraphenylborate under acidic conditions. Advantageously, the tetraphenylborate is immobilized on polymer beads and the water is contacted with the beads or passed through a bed of the beads.

14 Claims, 3 Drawing Sheets

USE OF TETRAPHENYLBORATE FOR EXTRACTION OF AMMONIUM IONS AND AMINES FROM WATER

CROSS-REFERENCE TO RELATED APPLICATION

This application is a continuation of Provisional Application Ser. No. 60/078,046, filed Mar. 16, 1998, and a divisional of application Ser. No. 09/267,610 filed Mar. 15, 1999, now U.S. Pat. No. 6,171,503.

FIELD OF THE INVENTION

This invention relates to the extraction of ammonia and amines from aqueous solution using tetraphenylborate salts, in particular sodium tetraphenylborate.

BACKGROUND OF THE INVENTION

Contaminants may enter the environment through discharge of industrial waste into a local water source, thereby imparting damaging and potentially devastating effects to the ecosystems which are dependent on the water source. Various methods have been proposed and implemented to reduce the level of contaminants present in water. However, such methods tend to be complicated and expensive, There is a need for alternative innovative technologies for removal of contaminants from waste water.

U.S. Pat. No. 4,695,387 (Berry et al.) discloses a process for continuous removal of ammonia from waste water using adsorption of ammonium ions to zeolite, and formation of ammonium phosphate from the adsorbed ammonium ions. The method employs a complex separation device having a plurality of chambers through which waste water must circulate. Although ammonium ion concentrations are reduced in waste water using this method, the removal of other nitrogen-containing contaminants from waste water is not addressed.

U.S. Pat. No. 5,641,413 (Momont et al., 1997) teaches removal of nitrogen from waste water having a high chemical oxygen demand. This method involves high temperature, high pressure oxidation and thermal denitrification to convert nitrogen-containing contaminants essentially to nitrogen gas. The process of U.S. Pat. No. 5,433,868 (Fassbender) employs a hydrothermal technique for removal of ammonia from water derived from sewage plant effluent. U.S. Pat. No. 5,407,655 (Sarritzu) discloses a process for recovery of pure (non-aqueous) ammonia from waste water through reaction with carbon dioxide, which also involves thermal decomposition, However, the high temperatures and pressures required in these processes necessitate the use of specialized tanks and equipment and thus tend to be expensive to conduct on a large scale.

U.S. Pat. No. 5,640,840 (Heitkamp et al., 1996) discloses a method for treatment of a liquid waste stream using microbial biodegradation whereby nitrogen-containing organic contaminants are ultimately converted to ammonia and carbon dioxide. The process involves flowing oxygenated waste water through a bed reactor supporting microbes capable of such biodegradation. This method requires the on-site presence of such a reactor, and recovery of purified water from the reactor may be a lengthy process.

Tetraphenylborates, particularly in the form of their alkali metal salts, are useful as counter ion components of cationic polymers in the field of non-linear optics (EP-A2-0 490 385), as polymerization initiators (U.S. Pat. No. 5,124,235), and as hydrophobic anionic functional groups dissolved in a polymeric matrix that is used in the separation of cesium and strontium from nuclear waste (U.S. Pat. No. 5,666,641). No work has heretofore been conducted to incorporate the use of tetraphenylborates in precipitation of ammonium ion or amines from waste water. All patents and publications referred to herein are expressly incorporated by reference.

SUMMARY OF THE INVENTION

An object of the invention is to provide a method of extracting ammonia and organic amines from water in an effective and environmentally acceptable manner.

One aspect of the invention provides a method for treatment of contaminated water to remove a nitrogen-containing species selected from ammonium ion and amines, which comprises contacting the water with sodium tetraphenylborate under acidic conditions, preferably weakly acidic conditions such as a pH value of between 3 and 7, and separating the treated water from the resultant precipitate of a salt of tetraphenylborate and the nitrogen-containing species.

Another aspect of the invention provides a method for treatment of contaminated water to remove a nitrogen-containing species selected from ammonium ion and amines (which hereinafter includes imines and any other species wherein the nitrogen atom will receive a proton), which comprises adjusting the pH value of the water to the acidic range, providing a polymer comprising a polymer backbone having a tetraphenylborate salt immobilized thereon, contacting the water with the polymer to dissociate the tetraphenylborate salt to tetraphenylborate ions and cations, whereby the nitrogen-containing species binds with the tetraphenylborate ions, and separating the treated water from the polymer having the nitrogen-containing species bound thereto. Preferably, the tetraphenylborate salt is a salt of $Li^+$, $Na^+$, $K^+$, $H^+$, $Ca^{+2}$ or $Mg^{+2}$. More preferably, $Na^+$ is the cation.

A further aspect of the invention provides a polymer for removing a nitrogen-containing species selected from ammonium ion and amines from contaminated water, which polymer comprises a polymer backbone having a tetraphenylborate salt immobilized thereon in the form of dissociated tetraphenylborate ions and cations.

According to another aspect of the invention, there is provided an article for use in the removal of ammonium ion or amine from contaminated water, which comprises a containment vehicle having associated therewith a quantity of a polymer as defined above. The polymer may be, for example, in the form of cross linked beads or inert particles, e.g. silica, surface treated to be coated with tetraphenylborate groups, and the containment vehicle comprises, for example, a porous bag for the beads, a structure for supporting a bed of the beads, or a bed of sand having the beads entrained therein.

The invention also provides an article which comprises a means for introducing a solid or gaseous contaminated water source containing ammonia or amines, and converting said source to aqueous state.

The term contaminated water should be understood to encompass any water source containing ammonium ion or amine, and the invention is contemplated for use in the removal of ammonium ion or amine from any such water source. Thus, the method may be used, for instance to remove ammonium ion or amine from ground water, non-point run-off water, mine infiltration water, industrial effluent, and any other type of contaminated water or waste water.

In the case where ammonium ions or amines may be air-borne, or found in any other gaseous medium, such compounds may be captured and converted from the gaseous medium to an aqueous medium and removed according to the invention. An example of such an application is in the case of volatile ammonia and amines which arise from animal waste in an environment such as an enclosed chicken barn. Additionally, ammonium ion or amines derived from a solid source, such as animal waste, could be solubilized in water and removed therefrom according to the invention.

The invention may also be used as a pre-concentration method for extracting and concentrating small traces of amines or ammonium ion before analysis therefor. The invention can thus be employed for test methods to quantify amines or ammonium ion. The invention may be used for analysis of street-drug mixtures, most of which are amines, whereby the amine component can be sequestered from an admixture. The invention may also be used for recovery of any amine which can be converted into a quaternary (charged) nitrogen system. Even $(CH_3)_4N^+$ and related species having no N—H bond can be extracted using the method of the invention.

Amines which form insoluble salts with the tetraphenylborate anion and can be removed from aqueous media according to the invention include aliphatic amines such as alkylamines including methylamine, ethylamine, and propylamine, as well as guanidine and biguanidine; diamines of the formula $NH_2 (CH_2)_n NH_2$ where n is an integer, such as ethylene diamine and propylene diamine; aromatic amines such as aniline and benzylamine; heterocyclic amines such as optionally substituted pyridine, pyramidine and pyrazine; polycyclic amines such as tropane and 1,4-diazabicyclo [2.2.2] octane (DABCOH), and also caffeine and nicotine.

The method is based on the formation of ammonium tetraphenylborate ($NH_4BPh_4$), a salt which is very insoluble in water. When a slightly acidic aqueous solution of ammonia or an amine is added to an aqueous solution of sodium tetraphenylborate, an immediate, thick, white precipitate is formed. This precipitate of $NH_4BPh_4$ is non-gelatinous, powdery but granular and is easily filtered. While $NH_4BPh_4$ is insoluble in water, it is soluble in acetone and acetonitrile. It can be recrystallised from acetone/water mixtures (or from acetonitrile) and the crystals appear to be stable indefinitely, Preferred pH values for the aqueous solution range from about 3 to 7, particularly from about 4 to 6.

The nitrogen-containing species in the contaminated water is normally in the form of a soluble inorganic or organic ammonium salt or an amine and the method of the invention is particularly suited to the treatment of waste water streams, such as water polluted with industrial effluent or acid rain. Mine infiltration water also contains a high ammonia concentration when derived from prehistoric sources. Removal of ammonia is required prior to release of mine infiltration water into the environment.

Simple, apparently uncomplicated, salts of ammonia are rarely insoluble. When the crystal structure of $NH_4BPh_4$ was completely determined (*Cand J Chem* 58 (1980) 1355), it was shown to be a most extraordinary system, The $NH_4^+$ and $BPh_4^-$ ions stack in columns, alternating . . . $NH_4^+$ . . . $BPh_4^-$ . . . $NH_4^+$ . . . $BPh_4^-$ . . . with the $NH_4$ ions trapped in a cage produced with a pair of phenyl groups from each of the two adjacent $BPh_4^-$ ions.

In itself this is not unusual, but within the columns the $NH_4^+$ ions form four hydrogen bonds to the planes of the four phenyl rings in the surrounding cage. The short contact N—H . . . Ph, the careful IR work in the paper cited above and elegant thermodynamic measurements by L. Stavely in Oxford in the 1960's (ref in Cand J. Chem paper) makes it clear that this N—H . . . Ph interaction is a significant hydrogen bond. The favorable lattice energy for $NH_4BPh_4$, which is the source of its insolubility, comes then not only from a most favorable ion packing but also has a contribution from these hydrogen bonds.

The contribution from the hydrogen bonds is crucial and instrumental in the unique properties of $NH_4BPh_4$. Our subsequent X-ray structure determinations have shown that the N—H . . . Ph hydrogen bond (or a variant thereof is present in every case where the organo-ammonium salt has an N—H bond while the very favorable cage arrangement has often been seriously degraded. We have ascertained that the charge interaction (cation/anion) is necessary as is the N—H . . . Ph interaction, but the symmetrical cage is less vital.

In order to verify the efficiency of the method of the invention, model systems were examined with $NH_4^+$ ions present in solution in concentrations ranging from 10 to 200 ppm. These solutions were treated with stoichiormetric quantities of $NaBPh_4$, dissolved in water and then one additional drop of $NaBPh_4$ solution was added to ensure the presence of $NaBPh_4$ in excess. The solutions were allowed to settle and the residual ammonium ion concentration in the supernatant was estimated by (a) Nessler's reagent, and (b) electrospray mass spectrometry seeking to detect the chloramine ion.

The Nessler's reagent studies gave consistent readings of a total residual $NH_4^+$ concentration in the supernatant liquid ranging between 3 and 5 ppm. The mass spectrometric measurements confirmed these results since no ammonium ions were detected in the supernatant liquid.

Thus, we concluded that $NH_4BPh_4$ is so insoluble a material that when equimolar quantities of $NH_4^+$ and $BPh_4^-$ ions are mixed in solution, the concentration of residual $NH_4^-$; ion (ions not complexed with $BPh_4^-$) is very low, probably below 1 ppm.

The supernatant liquid was examined by mass spectrometry over a period of several days. The boron species present in solution were easily identified by the natural isotopic abundance of boron. Over a period of a week, the levels of boron species in water stayed unchanged, and no new species were observed to emerge. These results confirm that the $NH_4BPh_4$ solid is stable over an extended period of time when left in contact with water. These experiments were conducted at two representative temperatures, 25 and 35° C. and both experiments showed the same stability.

Following extraction of the ammonium ion or amine, the $NaBPh_4$ can be regenerated as outlined below.

The method depends on the fact that although $NaBPh_4$ is soluble in water and $KBPh_4$ is insoluble, $KBPh_4$ is isomorphous with $NH_4BPh_4$. This is not surprising since $NH_4^+$ and $K^+$ occupy roughly tile same space in a crystal and are often mutually exchangeable in crystal structures.

While the two structures are isomorphous, the $KBPh_4$ system does not have the added advantage of four N—H . . . Ph hydrogen bonds. Thus, when $KBPh_4$ is stirred in a solution containing the $NH_4^+$ ion, the equilibrium:

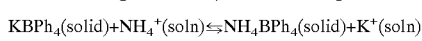

is strongly displaced to the right, that is towards the formation of $NH_4BPh_4$(solid).

The process involves stiring excess $KBPh_4$ in the $NH_4^+$ solution until the concentration $[NH_4^+]$ starts to rise. The "spent" $KBPh_4$ is then filtered off. The spent $KBPh_4$ is then stirred with a mild base such as $K_2CO_3$, and the ammonia and amines are released, since once the ammonia or amine is neutralized it loses its charge and the main component of the lattice energy of the $NH_4BPh_4$ salt is also lost. This simply reverses the equilibrium equation given above by the removal of the $NH_4^+$(soln) species from the system.

$KBPh_4$ is reformed by this process and the regenerated $KBPh_4$ can then be filtered and re-used. The filtrate contains the amines (and ammonia dissolved as $NH_3$) in solution. Acidification of the filtrate, followed by evaporation produces the solid ammonia and amine salts which can be collected and separated by differential vacuum sublimation.

In an alternative embodiment, sufficient $Na_2CO_3$ solution is added to the separated $NH_4BPh_4$ to neutralise all the ammonia and amines. $NaBPh_4$ remains in solution and the ammonia and amines can be removed by distillation (reduced pressure distillation to preserve the $BPh_4^-$ ion). The $NaBPh_4$ already in solution is then available for re-use.

Another aspect of the invention relates to the use of functionalized polymers or surface modified particles for separation of ammonium ions and amine salts from water. In the former case this involves the use of a polymer which incorporates the $BPh_4^-$ moiety. Such a polymer is preferably synthesized in the form of beads that consist of a lightly cross-linked network onto which $BPh_4^-$ groups are attached. In the latter case, a suitable material such as particles of silica, alumina or titania, for example, are subjected to a surface modification so as to chemically attach $BPh_4^-$ groups. Since it is important to maximize the interactions of the ammonium species with the $BPh_4^-$ groups, it is necessary to employ a polymeric backbone with suitable hydrophobicity. Many backbones may be used ranging from somewhat hydrophobic polystyrene to the more hydrophilic polyethers.

Preferred polymer backbones include polystyrenes, polyethers and polyacrylamides, as well as silica, which is an inorganic polymer. Further copolymers including these and other hydrophobic and hydrophilic monomers may also be used. Particularly advantageous polymers include a porous, lightly cross-linked polystyrene resin that is functionalized to contain the tetraphenylborate functional group, and a more hydrophilic polyether polymer system also functionalized to contain the desired functional group. In addition, silica particles may be used as the support (or polymer) and may be surface-coated so as to feature the desired functional group as the active entity.

In all three cases, the tetraphenylborate functional group is preferably neutralized as the sodium salt. The binding of the ammonium species occurs by the displacement of the sodium ions, as in normal ion exchange processes. Alternatively, the other suitable cations may be used such as $LI^+$, $K^+$, $H^+$, $Ca^{+2}$ or $Mg^{+2}$. The cations bound to the tetraphenylborate ion are herein referred to generally as M. Regeneration of the materials can be accomplished by washing with concentrated $Na_2CO_3$(NaCl) solution, sodium bicarbonate solution or carbonic acid, for example, using methods known to those skilled in the art.

The phenyl groups of the tetraphenylborate group can optionally be substituted in para position by halo, e.g. fluoro or chloro, lower alkyl, e.g. methyl, or lower alkoxy, e.g. methoxy.

The following embodiments are presented as detailed examples of polymers for use in the invention.

All embodiments contain the active binding unit, tetraphenylborate, attached directly or indirectly to a polymeric backbone as shown schematically in formula (I) below. The tetraphenylborate moieties may be present as surface modifying agents or incorporated into a cross-linked resin. In formula (I), the tether ($R^1$) may be a lower alkyl group or simply a carbon-to-carbon bond, and M is a cation.

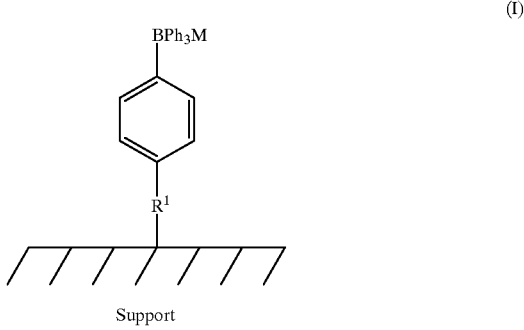

(I)

In a first embodiment, a polymer comprises cross-linked, functionazed polystyrene to which tetaphenylborate is tethered, and has the general formula:

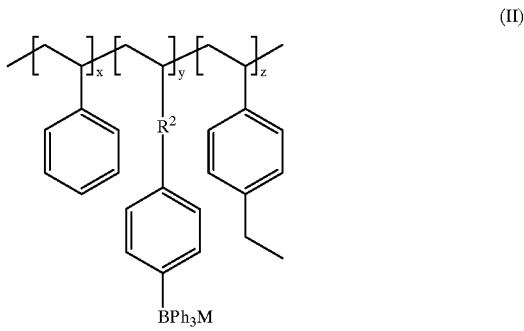

(II)

wherein x refers to a styrene comonomer and is from 0 to 50 mol %, z refers to a cross linking agent and is from 1 to 10 mol %, y refers to a comonomer having the tethered tetraphenylborate group and is [100−(x+z)] mol %, and $R^2$ is a carbon-to-carbon bond or $C_1$ to $C_6$ alkyl, and M is a cation.

In a second embodiment, a polymer comprises a cross-linked polyether backbone with tetraphenylborate tethered thereto, and has the following repeating unit:

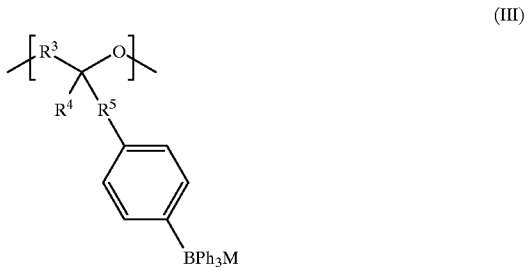

(III)

$R^3$ is $C_1$–$C_6$ alkyl $R^4$ is H or $C_1$–$C_6$ alkyl, $R^5$ is a carbon-to-carbon or $C_1$–$C_6$ alkyl, and M is a cation.

More specifically, according to the second embodiment, a polymer comprises a polyether backbone with tetraphe nylborate tethered thereto, and has repeating units as follows:

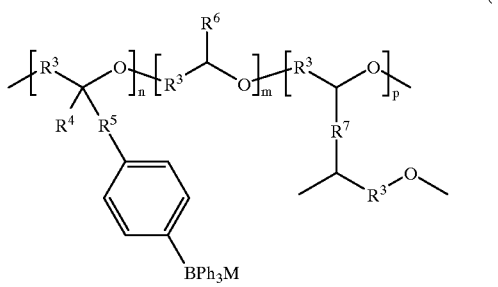

(IIIa)

wherein:
each $R^3$ independently represents $C_1$–$C_6$ alkyl,
$R^4$ is H or $C_1$–$C_6$ alkyl,
$R^5$ is a carbon-to-carbon bond or $C_1$–$C_6$ alkyl,
$R^6$ is phenyl or $C_1$–$C_6$ alkyl
$R^7$ is phenyl $C_1$–$C_6$ alkyl or cross linking unit,
M is a cation,
m is 0–50 mol % (comonomer),
p is 1 to 10 mol % (cross linking agent), and
n is [100–(m+p)] mol % (comonomer having the tethered tetraphenylborate group).

In a third embodiment a polymer comprises a silica backbone having pendant tetraphenylborate groups as shown below:

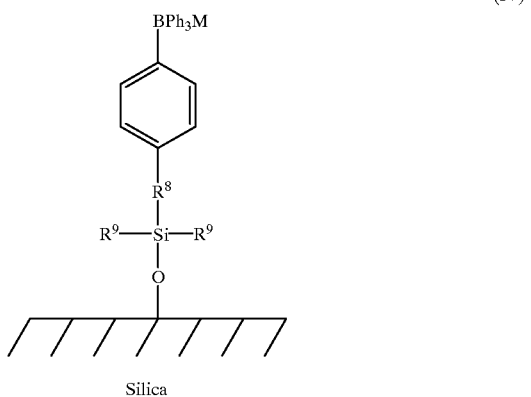

(IV)

wherein $R^8$ is a carbon-to-carbon bond or $C_1$–$C_6$ alkyl, and each $R^9$ independently represents $C_1$–$C_6$ alkyl or H, and M is a cation.

DESCRIPTION OF THE PREFERRED EMBODIMENTS

The use of functionalized cross-linked polystyrene beads as ion-exchange resins is a well-established industry (e.g., Dörfner, "Ion Exchangers"). Thus, the chemical techniques used in their preparation are well known in the art. Generally, the polystyrene-type (e.g. chloro-methylated) beads are prepared by suspension free radical polymerization techniques, generally using an organic initiator such as benzoyl peroxide or azobisisobutyronitrile (AIBN). Subsequent reactions can then be used to attach the desired functional group to the polystyrene backbone.

Free radical polymerization of p-bromostyrene, by suspension polymerization techniques known in the art, is used to prepare polymer beads approximately 100 to 400 microns in diameter. The bead size may be controlled by appropriate choice of surfactant and stirring design. Divinyl benzene is used as the cross-linking agent, In amounts varying between 1 and 10% by weight. A pore forming agent, such as butyl ether, ensures that the resulting beads are highly porous, as desired for effective sorbents. The density of functional groups, i.e., the number of sites/unit volume of resin, may be varied by copolymerization with styrene such that the resulting polymer will be a random copolymer of p-bromostyrene and styrene. The use of the comonomer serves to minimize additional cross-linking that could accompany subsequent functionalization reactions described below.

Figure 1:
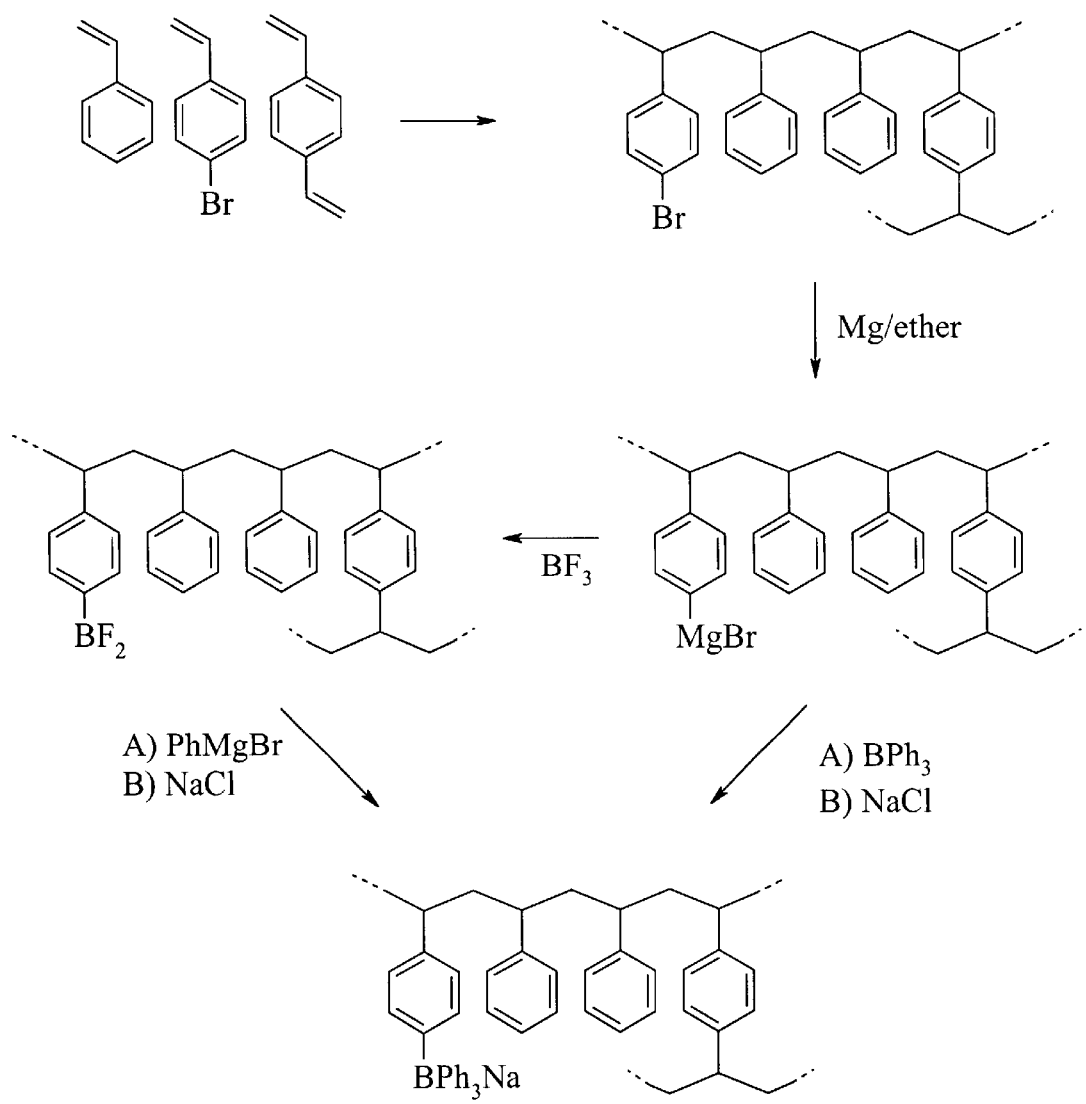
FIG. 1 shows schematically the reactions involved in the preparation of a polystyrene derivatized with tetraphenylborate.

The brominated sites of the polymer beads are reacted with magnesium metal in ether to produce a Grignard reagent that reacts subsequently with $BF_3$ to form the polymer $BF_2$ derivative. This reaction of the polymer Grignard reagent with $BF_3$ requires careful control of reaction conditions, particularly stoichiometry, so as to minimize additional cross-linking. Such additional cross-linking has two adverse effects; (i) it decreases the density of functional groups, hence the ultimate binding capacity of the sorbent; and (ii) it makes the polymer more rigid, hence it is more difficult for the sorbate to penetrate the beads. Finally, reaction with another Grignard reagent, for example phenylmagnesium bromide, results in the formation of the desired tetraphenylborate functional sites. To remove the magnesium cations this polymer is washed with concentrated aqueous NaCl solution which results in the sodium salt, as desired. This sequence of reactions is shown in FIG. 1. The individual reactions are efficient so that essentially 100% yield can be obtained at each stage.

Alternatively, a polymeric bead containing phenyl bromide groups is reacted with an alkyl lithium reagent to form the corresponding aryl lithium intermediate which may be reacted directly with triphenyl boron to give a polymeric matrix with pendant tetraphenyl borate groups.

Figure 2:
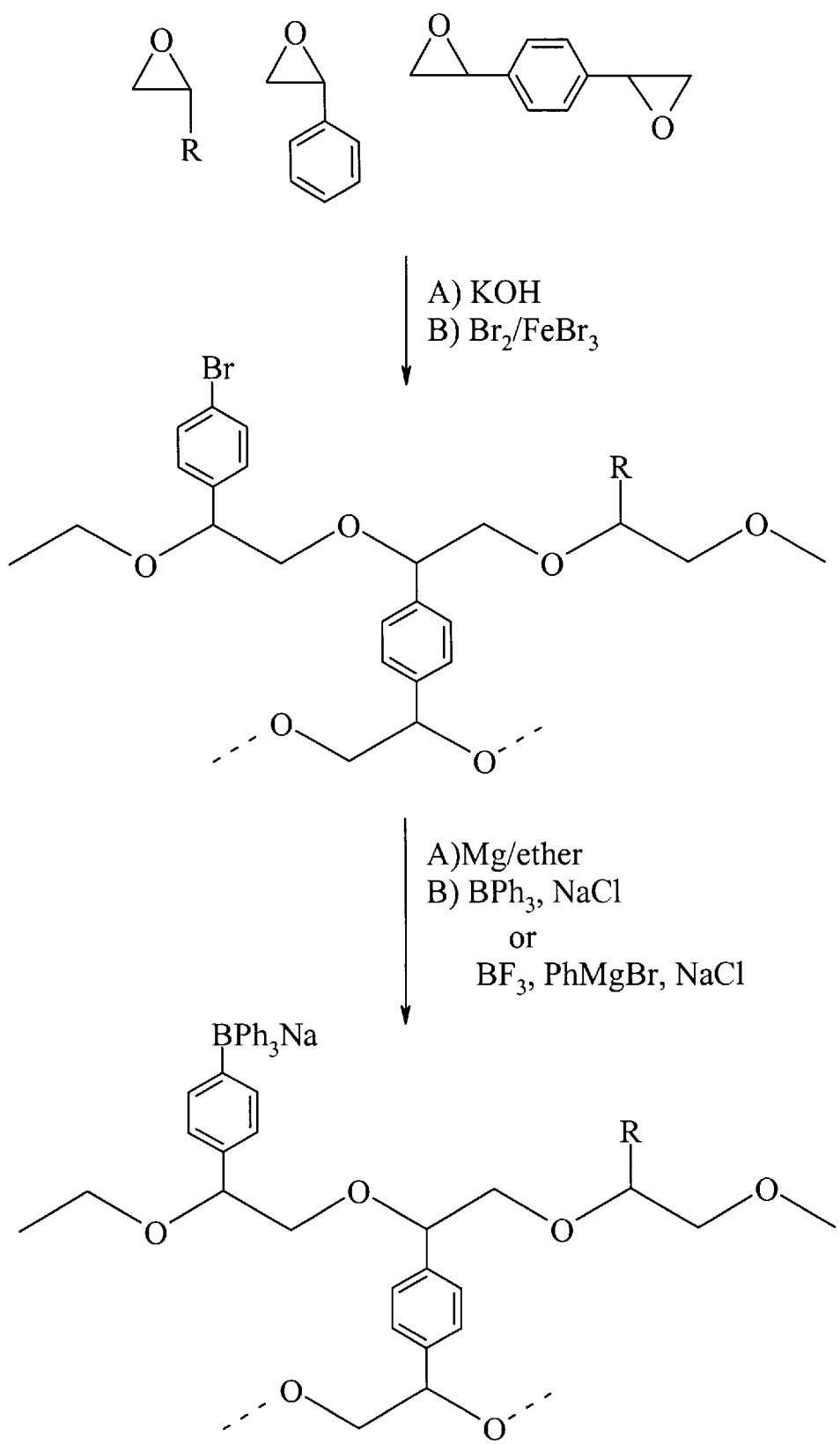
FIG. 2 shows the reaction schematics for preparing a polyether.

The synthesis of cross linked beads with a more hydrophilic polyether is shown schematically in FIG. 2. While styrene oxide is commercially available, the cross-linking agent used for the synthesis of the polyether resin beads, namely 1,4-diepoxybenzene, must be synthesized. Since epoxides are easily generated from alkenes by reaction with peroxy acids (e.g. peractic acid or, more commonly, meta-chloro-perbenzoic acid) the desired cross-linking agent can be obtained by the oxidation of divinyl benzene, These oxiranes, styrene oxide and 1,4-diepoxybenzene can be polymerized, for example, by a base-catalyzed ring opening mechanism. Thus, beads of poly(styrene-oxide) can be synthesized in a biphasic system using hydroxide and a phase transfer catalyst with styrene oxide and 1,4-diepoxybenzene. If desired, pore-forming agents may be included in the polymerization process.

The resultant polymer, or copolymer, can be brominated by reaction with bromine and iron (III) bromide. Finally, the triphenylboron moiety is added as described earlier using Grignard chemistry. The hydrophilicity of this system can be maximized, for example, by co-polymerizing propylene oxide to increase the relative oxygen to hydrocarbon ratio.

In another embodiment, a free-radical type polymerization can be used for this system. Controlling bead-size and tetraphenylborate density involves optimization of bromine, catalyst, and monomer concentrations as well as the solvent system and the practical aspects, such as stirring rate.

In yet another embodiment of the invention, silica particles are treated so that immobilized tetraphenylborate groups are attached to or synthesized on the surface of the silica particles. The use of silica as the support for functional groups is a common practice, for example, in the preparation of packing materials for chromatography columns. Hence, the chemistry is well developed and will be familiar to those skilled in the art.

Figure 3:
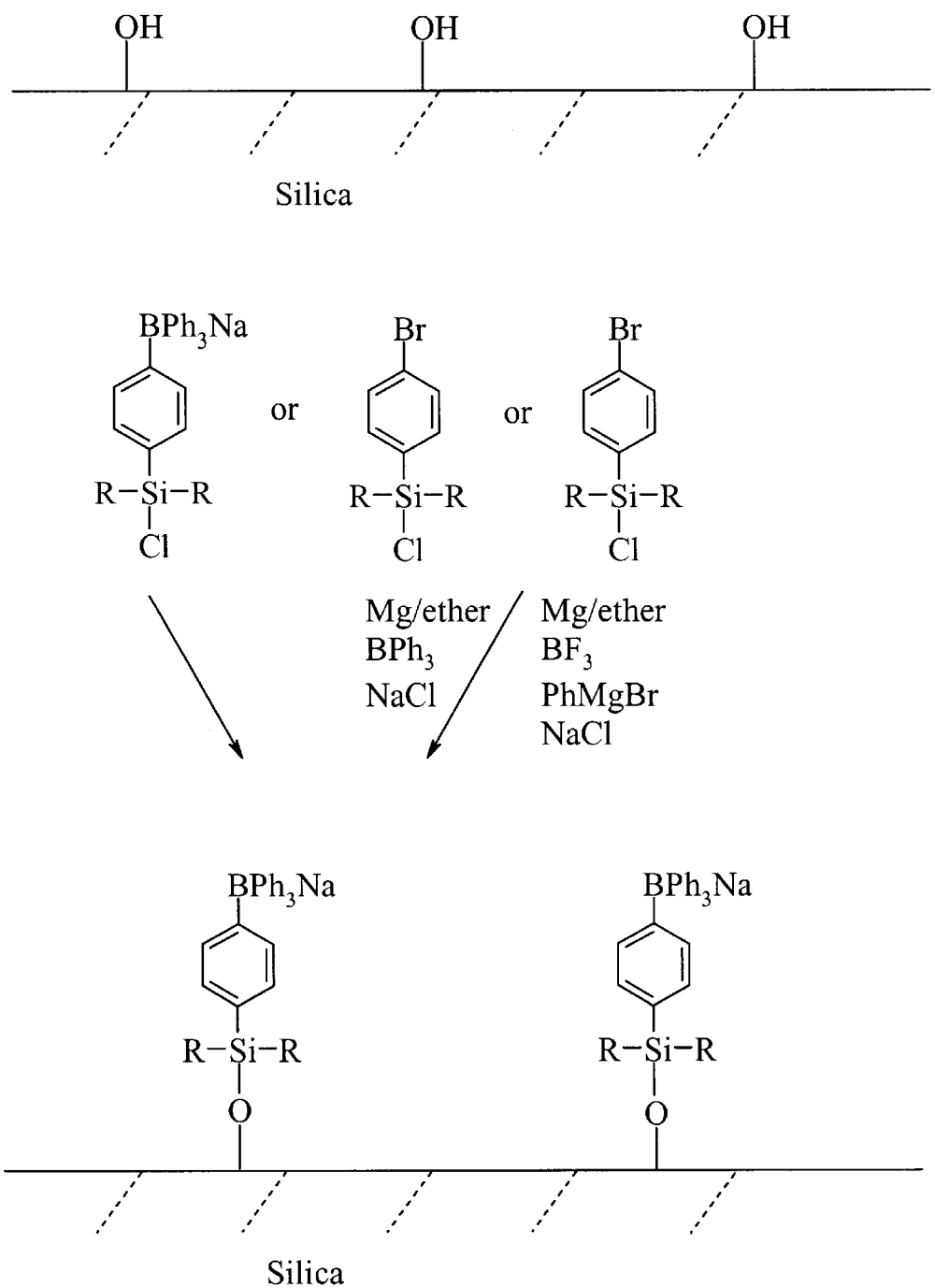
FIG. 3 illustrates the formation of a silica with tetraphenylborate derivatization.

Silica particles of various sizes are readily available from various commercial sources, e.g., Cabot. The surface hydroxyl groups are commonly used as reactive sites that can be used for the synthesis of various surface layers. For the preparation of silica that is surface-coated with the tetraphenylborate functional groups a chlorosilane coupling agent is synthesized that possesses the tetraphenylborate functional group. This coupling agent is then attached to the silica particles by reaction with the surface hydroxyl groups thereof. Alternatively, a commercially available bromophenyl silane coupling agent ($R_xCl_{(3-x)}SiPhBr$) can be attached to the surface of the silica. By a series of subsequent reactions, similar to those described above for polystyrene, the bromo group is converted to form the tetraphenylborate. This is shown schematically in FIG. 3.

The commercially available silane coupling agent $R_xCl_{(3-x)}SiPhBr$ can be converted to a Grignard reagent by reaction with magnesium metal in ether or a lithium reagent with an alkyl lithium. These intermediates can then be converted to the tetraphenylborate as described above. In a subsequent reaction with the surface hydroxyl groups of the silica particles chemical attachment of the modified tetraphenylborate moiety is attained.

The commercially available silane coupling agent $R_xCl_{(3-x)}SiPhBr$ is attached chemically to the silica surface and subsequent reactions at the bromo site, similar to those described above, result in the formation of the tetraphenylborate moiety.

Once the $BPh_4^-$ ion is securely tethered to a polymer backbone it can be recycled relatively easily and cost effectively. The polymer is not water soluble but is water wettable. It is preferably in the form of small beads. A waste water stream may be passed, for instance, through a column containing the polymer, or a bag containing polymer beads may be dropped into water. Alternatively, the waste water can be passed through a bed of sand having the silica beads dispersed therein. The $NH_4^+$ (and organo-ammonium) ions are bound by the tethered $BPh_4^-$ ions. $M^{2+}$ ions will not be bound, and the $BPh_4^-$ will bind all organo-diamines as mono-protonated species.

The ammonium and organo-ammonium species are released from the $BPh_4^-$ interaction once the surrounding solution is made basic. Thus, once the spent polymer is washed with, for instance, $Na_2CO_3$ solution, the ammonia and amines are released and the starting material regenerated. Alternatively and cheaper, the material can simply be swamped with $Na^{30}$ ions by washing it with concentrated NaCl solution. This expels the ammonium ions by force of $Na^+$ concentration. Washing the material with $CO_2$ in water (carbonic acid) is also feasible. This washes out ammonia as $(NH_4)_2CO_3$, the amines as amine carbonates/bicarbonates and regenerates an acidic material. The acidic material then later exchanges $H^+$ for $NH_4^+$.

EXAMPLES

Reagents and reactants were prepared as follows:
Ammonia-free Water

Ammonia-free water was used in preparation of all solutions and reagents in all experiments. Ammonia-free water was obtained as follows. Distilled water (1000 ml) was added to potassium permanganate (2.01 g) and anhydrous sodium carbonate (2.04 g). The solution was refluxed for approximately 1 hour. The intense purple initial solution boiled rapidly for 1 hour. The first portion (100 ml) of clear distillate was discarded and the remaining distillate was collected at a rate of about 100 ml/30 minutes.
Preparation of Standards and Solutions Standard solutions of $NH_4Cl$ were prepared having different concentrations between 1 and 200 ppm $NH_4^+$. Standard curves for $NH_4^+$ were determined via mass spectrometry, spectrometric analysis at wavelengths from 400 to 425 nm (412 nm preferred) using Nessler's reagent (an alkaline solution of mercuric iodide and potassium iodide), and by measurements obtained from $NH_4^+$ specific electrodes. Standard solutions of sodium tetraphenylborate having between 1 and 200 ppm tetraphenylborate ion were also analysed via mass spectrometry.
Experiment 1
Formation of Ammonium Tetraphenylborate A 100 ml aliquot of an $NH_4Cl$ solution having 200 ppm $NH_4^+$ was added to a 100 ml aliquot of a sodium tetraphenylborate solution having 200 ppm equivalent tetraphenylborate ion. A small aliquot (about 5 ml) of the sodium tetraphenylborate solution was added to ensure excess of tetraphenylborate ion. The mixture was allowed to stand overnight to permit the ammonium tetraphenylborate salt to precipitate and settle. The mixture was additionally centrifuged and a clear supernatant was removed and analysed for $NH_4^+$ using the above-described methods.

No ammonium ion was detected in the ammonia-free water using Nessler's reagent. Mass spectrophotometric methods detected ammonium ion in distilled water but not in the ammonia-free water prepared according to the above method.

During the formation of ammonium tetraphenylborate, a milky white precipitate was immediately formed when each of the sodium tetraphenylborate solutions was mixed with each of the ammonium chloride solutions. The supernatant derived following formation of ammonium tetraphenylborate was also found to be free of ammonium ion when analysed using mass spectrophotometric methods. This indicates that all of the ammonium ion present in the solution was precipitated out as the tetraphenylborate salt.

It was noted that during mass spectrophotometric analysis, at approximately pH 10, in the presence of chlorine. $NH_4^+$ forms Cl—$NH_2$. Cl—$NH_2$ binds to the tetraphenylborate ion. Thus, the removal of this molecule and other similar inorganic nitrogen-containing compounds from waste water through insoluble salt formation with the tetraphenylborate ion falls within the scope of the invention.
Experiment 2
Effect of pH, Temperature and Time on Formation of Ammonium Tetraphenylborate Aliquots (100 ml) of solutions having either 100 or 200 ppm ammonium ion were adjusted with dilute HCl to pH values between 4 and 6. An aliquot (100 ml) of a solution containing the equivalent strength of sodium tetraphenylborate was added to each solution of ammonium ion. An extra 5 ml of the sodium tetraphenylborate solution was added to each mixture to ensure excess of the tetraphenylborate ion. The solutions were allowed to settle overnight and thereafter the supernatant was tested for ammonium ion spectrophotometrically using Nessler's reagent. Table 1 shows the resulting ammonium ion content of the supernatant for each solution.

TABLE 1

Clearance of ammonium ion by tetraphenylborate at different pH values

| Initial [$NH_4^+$] (ppm) | pH | Supernatant [$NH_4^+$] (ppm) |
|---|---|---|
| 100 | 4.0 | 3 |
| 200 | 4.1 | 2–3 |
| 100 | 5.3 | 3 |
| 200 | 5.2 | 3 |
| 100 | 6.0 | 3 |

All ammonium ion solutions having pH values ranging between 4 and 6 showed nearly complete clearance of ammonium ion from solution when sodium tetraphenylborate was added.

Solutions of 100 and 200 ppm ammonium ion were again combined with sodium tetraphenylborate solutions, as above. pH values were adjusted to between 4 and 6. Aliquots of each solution were incubated for between 2 and 5 days in a thermostatically controlled water bath at 30° C., 35° C. or 40° C. When supernatants were analysed for residual [$NH_4^+$] using Nessler's reagent, all fell within the range of from 2 to 4 ppm.

Long term stability of the ammonium tetraphenylborate salt in aqueous solution was tested by mixing a 200 ppm solution of ammonium ion with a 200 ppm sodium tetraphenylborate solution, as described above. Initial residual [$NH_4^+$] was determined as 6 ppm. The mixture, including the ammonium tetraphenylborate precipitate was allowed to sit for 48 hours, and for an additional 1 week. No change in residual [$NH_4^+$] occurred in this time period, and no change in the boron content of the supernatant was detected (as determined by mass spectroscopy), indicating that free boron was not arising from the precipitate and that the precipitate is thus relatively stable over time.

It was noted that the ammonium ion specific electrode did not provide reliable readings when the tetraphenylborate ion was present in the solution. Thus, the spectrophotometric analysis using Nessler's reagent was used to assess ammonium ion concentration.

Experiment 3
Synthesis of Polystyrene Having Tethered Tetraphenylborate

Poly(4-bromostyrene) was synthesized directly from the monomer by standard free-radical techniques. 240 mg (1.3 mmol aryl bromide) of vacuum-oven dried poly (4-bromostyrene) was dissolved at room temperature in 20 ml of dry tetrahydrofuran freshly distilled from a standard sodium/benzophenone complex all in an ultrapure nitrogen atmosphere. The reaction temperature was reduced to −78° C. in a dry ice/acetone bath and 1.1 ml of a 1.3M solution of sec-butyl lithium (1.4 mmol or ca. 10% excess) was added dropwise over 1–2 minutes.

The reaction was left to stir at low temperature for four hours whereupon an aliquot was removed and quenched in acidified water. The poly (styryl lithium) intermediate product crosslinked suggesting a terpolymer of cross-linked styrene, debrominated styrene and possibly unreacted 4-bromostyrene. A new peak in the phenyl fingerprint infrared spectrum at 700 wavenumbers, when paired with a peak at about 820 wavenumbers indicated the formation of the "proton-trapped" lithiation intermediate (polystyrene).

6.0 ml triphenyl boron solution (0.25M in THF or 1.5 mmol—used as received from Aldrich) was added to the reaction mixture at −78° C. and the reaction mixture was allowed to warm to ambient conditions overnight. A sandy colored precipitate with a faintly cloudy supernatant was observed 12 hours after the triphenyl boron addition.

The reaction was quenched in rapidly stirred distilled water giving rise to small polymeric particles (295 mg dry mass) which give IR spectra indicative of successful functionalization (eg mono-substituted phenyl groups). The particles were swellable on immersion in tetrahydrofuran, but did not redissolve indicating a cross-linked resin. Based on I.R. analysis, the product was determined to be a cross-linked polystyrene having a minimum of 25% functionalization by tethered tetraphenylborate. Both the polymeric starting material and regular homopolystyrone are very soluble in tetrahydrofuran. The aqueous fraction was blue-tinged and otherwise transparent. On evaporation of the water, a film and some solid residue remained, indicative of tetraphenylborate side reactions and non-crosslinked polymer.

The results of I.R. spectral analysis for intermediate and final products are as follows:
Poly(4-bromostyrene)

| 3629.93 | 3019.95 | 2925.12 | 2851.36 | 2360.05 | 1895.70 |
| 1772.09 | 1652.73 | 1588.55 | 1486.02 | 1448.27 | 1408.21 |
| 1362.52 | 1180.26 | 1102.23 | 1073.68 | 1009.23 | 941.23 |
| 907.44 | 821.81 | 755.20 | 718.08 | 667.99 | 630.66 |
| 541.98 | | | | | |

END 25 PEAK(S) FOUND
Lithiation quenched in acidified water

| 3447.29 | 2922.95 | 1635.75 | 1486.93 | 1456.97 | 1448.14 |
| 1437.00 | 1407.82 | 1180.47 | 1073.76 | 1009.34 | 819.10 |
| 757.08 | 717.05 | 699.63 | 668.13 | 539.90 | |

END 17 PEAK(S) FOUND
Cloudy supernatant 15 hours after triphenyl boron addition (film-dried in vacuo)

| 3543.08 | 3043.99 | 2927.31 | 1897.47 | 1599.33 | 1485.74 |
| 1442.37 | 1406.32 | 1252.20 | 1179.41 | 1145.99 | 1111.66 |
| 1071.63 | 1027.26 | 1009.08 | 884.54 | 823.71 | 744.56 |
| 702.05 | 679.49 | 615.98 | 601.90 | 581.13 | 542.11 |

END 24 PEAK(S) FOUND
Precipitate in water dried vacuo pellet

| 3567.85 | 3020.20 | 2921.70 | 2847.54 | 1894.95 | 1700.15 |
| 1653.05 | 1599.49 | 1485.80 | 1448.24 | 1431.72 | 1407.05 |
| 1240.35 | 1181.21 | 1102.62 | 1073.05 | 1008.93 | 885.68 |
| 819.09 | 737.15 | 716.40 | 699.70 | 649.65 | 609.24 |
| 542.16 | | | | | |

END 25 PEAK(S) FOUND

The precipitate was tested in the following manner: (Test 1); 2 ml of an aqueous solution of ammonium chloride (115 ppm) was stirred overnight with 30 mg of the polymeric precipitate in an airtight vial. (Test 2): 5 ml of the ammonium chloride solution were added to 20 mg of the aqueous fraction residue from the above reaction. (Control): stock ammonium chloride solution was reserved.

Two aliquots (300 microliters) were then withdrawn from the liquid of each of tests 1 and 2 and the control and were tested with one drop of Nessler's solution. The control and test 2 assays (four total) turned red/orange on addition of Nessler's solution (yellow) indicating high concentrations of ammonium cations. The final colour of the test 1 assays was yellow/orange, indicating a lower concentration of ammonium cations. This test confirms that the polymeric product sequesters ammonium cations from aqueous solutions.

Experiment 4

The high-angle, low temperature, X-ray crystal structures of four representative organo-ammonium tetraphenylborate salts were studied for the purpose of defining the N—H . . . ($\pi$)phenyl interaction. More specifically the structures of the ammonium, guanidinium $[(NH_2)_3C]^+$, biguanidinium $[((NH_2)_2C)_2N]^+$, and DABCOH$^+$ (mono-protonated 1,4-diazabicyclo[2.2.2]octane) $[HN(CH_2)_3N]^+$, tetraphenylborate salts were examined by X-ray diffraction using the charge-density, multipole refinement techniques. The X-ray data were collected on a R-Axisli imaging plate system at $-120°$ C. with Mo—Ka radiation to $\sin(\theta)/\lambda=1.0$ cm$^{-1}$.

The X—H . . . $\pi$(phenyl) interactions were observed in the resulting deformation density maps. The parameters from the multipole refinements were then used to determine and quantity the topological features of the interaction, using Bader's theory of "Atoms in Molecules" (Bader, R. F. W. Atoms in Molecules—A Quantum Theory OUP, England, 1990; Bader R. F. W. Chem. Rev. 1991, 91, 893; Bader, R. F. W. J Phys. Chem. (A) 1998, 102, 7314). This showed that there was a definite, identifiable N—H . . . $\pi$(phenyl) hydrogen-bonding interaction between the ammonium or organo-ammonium cation and the ($\pi$) system of the phenyl ring(s). The XDPROP program in the XD package (Koritssnszky, T.; Howard, S. T.; Richter T. Mallinson, P. R.; Su, Z.; Hansen, N. K. XD, A Computer Program Package for Multipole Refinement and Analysis of Charge Densities from X-ray Diffraction Data 1995) was used for this. In the four salts there are 14 N—H . . . $\pi$(phenyl) interactions and in every N—H . . . $\pi$(phenyl) interaction, a (3-1) bond critical point was found between the (H) and $\pi$(phenyl) species. XDPROP was then used to locate the bond path (path of maximum electron density) on either side of these critical points. In every case, the path traveled in one direction back to the N—H system and traveled smoothly on to the (X) species in the opposite direction. The value of the electron density ($p_b(r)$) and the Laplacian ($\nabla^2 p_b(r)$) were calculated at each of the critical points. The values of the Laplacian (($\nabla^2 p_b(r)$)) in all cases are positive, indicating the expected closed-shell nature of the interactions The values place the N—H . . . $\pi$(Ph) interactions as slightly weaker in energy than the conventional N—H . . . N hydrogen bonds but from both the topology and the critical point values the N—H . . . $\pi$(Ph) interactions are clearly hydrogen bonds.

The geometries of these four salts are representative of all the organo-ammonium tetraphenyl borates salts and the formation of this N—H . . . $\pi$(phenyl) interaction is characteristic in the formation and precipitation of the organo-ammonium tetraphenylborate salts.

In conclusion, according to the invention, NH$_4^+$ and amines can be removed from waste water through insoluble salt formation with the tetraphenylborate ion. The ammonium tetraphenylborate salt is stable over long periods in aqueous solution. Tethering the tetraphenylborate ion in a polymer is useful in the removal of NH$_4^+$ and amines from waste streams. Tetraphenylborate ion which is tethered to a polymeric backbone can be used for removal of NH$_4^+$ and amines from waste water and can be regenerated by release of the NH$_4^+$ and amines therefrom, thereby providing inexpensive and beneficial means to environmentally treat industrial, agricultural and other waste water or streams.

While the invention has been described in detail with reference to certain preferred embodiments thereof, it will be apparent to those skilled in the art that modifications and variations are within the spirit and scope of that which is described and claimed.

We claim:

1. A polymer for removing a nitrogen-containing species selected from ammonium ion and amines from contaminated water, which polymer comprises a polymer backbone having a tetraphenylbotate salt immobilized thereon.

2. A polymer according to claim 1, wherein the tetraphenylborate salt is a salt of Li$^+$, Na$^+$, K$^+$, H$^+$, Ca$^{+2}$ or Mg$^{+2}$.

3. A polymer according to claim 1, wherein the polymer backbone is formed of polystyrene, polyether, polyacrylamide, or a copolymer of styrene and/or epoxide with one or more hydrophobic and/or hydrophilic monomers.

4. A polymer according to claim 1, wherein the polymer backbone comprises an inorganic polymeric support selected from silica, alumina and titania.

5. A polymer according to claim 3, which is a polystyrene having repeating units of the formula:

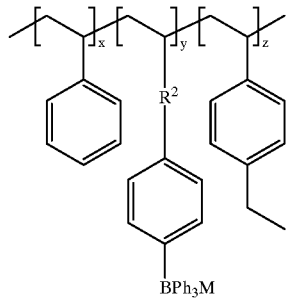

(II)

x being present in a mole percent of from 0 to 50, z being present in a mole percent of from 1 to 10, and y being present in a mole percent equal to [100−(x+z)], and wherein R$^2$ is a carbon-to-carbon bond or C$_1$ to C$_6$ alkyl, and M is a cation.

6. A polymer according to claim 3, wherein the polymer is a polyether containing a repeating unit having the formula:

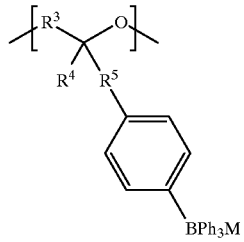

(III)

wherein:

R$^3$ is C$_1$–C$_6$ alkyl,

R$^4$ is H or C$_1$–C$_6$ alkyl,

R$^5$ is a carbon-to-carbon bond or C$_1$–C$_6$ alkyl, and

M is a cation.

7. A polymer according to claim 4, wherein the polymeric support is silica, and containing pendant groups of the formula:

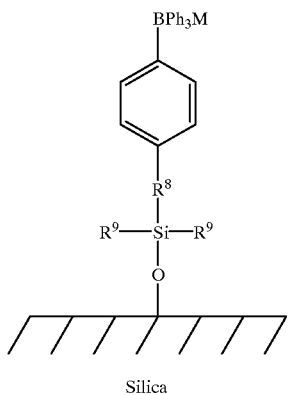
(IV)

wherein $R^8$ is a carbon-to-carbon bond or $C_1$ to $C_6$ alkyl, and each $R^9$ independently represents $C_1$ to $C_6$ alkyl or H, and M is a cation.

8. An article for use in the removal of ammonium ion or amine from contaminated water, which article comprises a containment vehicle having associated therewith a quantity of a polymer as defined in claim 3.

9. An article according to claim 8, wherein the polymer is in the form of beads or is coated onto beads, and the containment vehicle comprises a porous bag for the beads, a structure for supporting a bed of the beads, or a bed of sand having the beads entrained therein.

10. An article according to claim 8, which article comprises a means for introducing a solid or gaseous contaminated water source containing ammonia or amines, and converting said source to aqueous state.

11. An article according to claim 10, wherein the polymer is in the form of beads or is coated onto beads, and the containment vehicle comprises a porous bag for the beads, a structure for supporting a bed of the beads, or a bed of sand having the beads entrained therein.

12. A polymer according to claim 5, wherein the cation is defined as $LI^+$, $Na^+$, $K^+$, $H^+$, $Ca^{2+}$ or $Mg^{2+}$.

13. A polymer according to claim 6, wherein the cation is defined as $LI^+$, $Na^+$, $K^+$, $H^+$, $Ca^{2+}$ or $Mg^{2+}$.

14. A polymer according to claim 7, wherein the cation is defined as $LI^+$, $Na^+$, $K^+$, $H^+$, $Ca^{2+}$ or $Mg^{2+}$.

* * * * *